March 2, 1954     R. E. CHERRY     2,670,825
ONE-WAY ENGAGING DEVICE
Filed Sept. 22, 1950
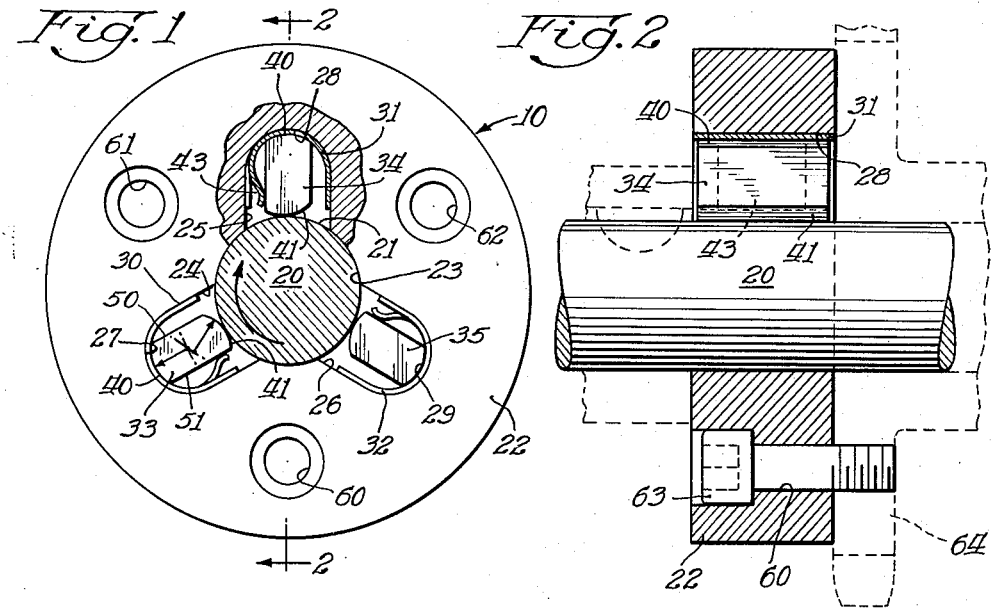
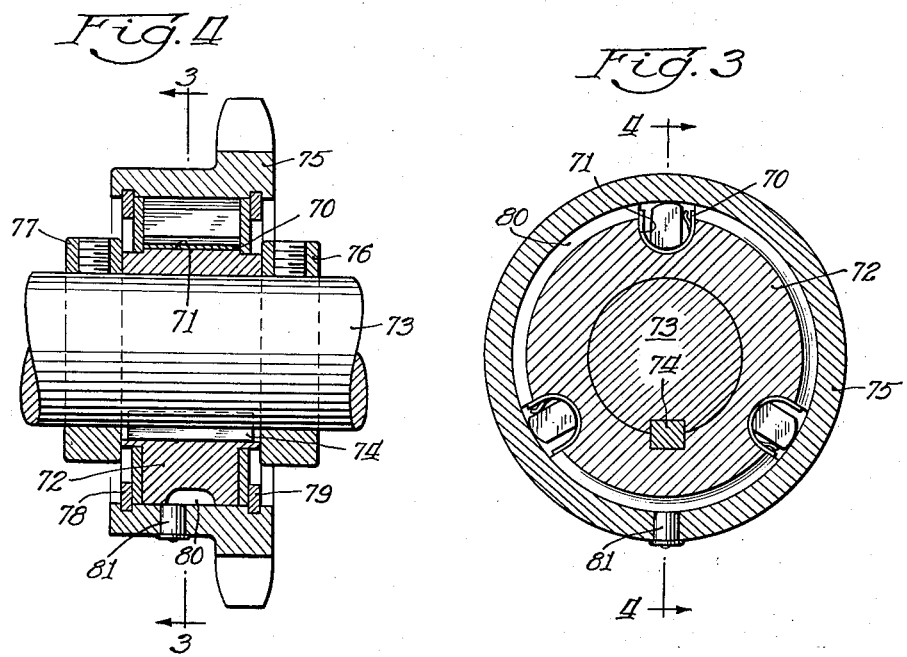
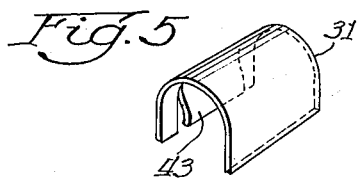
Inventor:
Ralph E. Cherry Patented Mar. 2, 1954

2,670,825

UNITED STATES PATENT OFFICE 2,670,825

ONE-WAY ENGAGING DEVICE

Ralph E. Cherry, Detroit, Mich., assignor to Morse Chain Company, Ithaca, N. Y., a corporation of New York Application September 22, 1950, Serial No. 186,253

5 Claims. (Cl. 192—45.1)

This invention relates in general to clutches and is particularly concerned with clutches of the one-way type.

Otherwise stated, the invention is embodied in a one-way clutch of the type in which a series of sprags are arranged between drive and driven members. With such constructions relative rotation of the drive and driven members will be free in one direction, but in the reverse direction will cause instantaneous clutching by said sprags. It is, however, necessary that the sprags should have their end surfaces held in contact with the adjacent surfaces of the drive and driven members and with sufficient pressure to produce the necessary friction for instantaneous clutching.

More specifically stated, it is a general object and accomplishment of the invention to provide a one-way clutch in which the sprags of the entire series are disposed in spaced relationship to each other and individually tensioned to hold the same in frictional engagement with the cooperating surfaces.

Another object of the invention is to provide a one-way clutch whereby a substantially uniform pressure against the sprags is effected to advantageously provide substantially uniform loading.

An important feature of the invention is the provision of a single outer member as a bushing, clutch ring and cam spacer, said outer member having recesses adapted to receive removable and replaceable spring clips pressed into said recesses and providing a hardened seat in which the sprag can work as well as serving as a sprag energizing medium.

The invention further contemplates the provision of a simply constructed one-way clutch that is capable of being made of relatively small dimensions.

A further object of the invention is to provide a one-way clutch in which the outer member is a combination clutch ring and sprag spacer and the sprag parts are accommodated by the outer member without the sacrifice of space between the races heretofore necessary to accommodate a carrier.

An ancillary object and accomplishment of the invention is to provide a new and improved one-way clutch which is adapted to be economically manufactured and which is so designed as to permit the manufacture and assembly thereof in accordance with present day large scale mass production manufacturing methods of construction and assembly.

The invention seeks, as a further object and accomplishment, to provide a one-way clutch particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described and as more particularly pointed out in the appended claims.

Embodiments of the invention are illustrated in the accompanying drawings forming a part hereof and wherein:

Fig. 1 is a side elevational view of a one-way clutch embodying the features of the present invention and with portions thereof shown in section to more clearly illustrate the construction thereof;

Fig. 2 is a sectional view of the one-way clutch depicted in Fig. 1 and being taken substantially on the plane of the line 2—2 in Fig. 1;

Fig. 3 is a sectional view of a modified form of a one-way clutch embodying the features of this invention and being taken substantially on the plane of the line 3—3 in Fig. 4;

Fig. 4 is a sectional view of the one-way clutch depicted in Fig. 3 and being taken substantially on the plane of the line 4—4 in Fig. 3; and Fig. 5 is a perspective view of a spring clip which serves as a hardened seat in which the sprags can work as well as a sprag energizing medium.

The drawings are to be understood to be more or less of a schematic character for the purpose of illustrating and disclosing typical or preferred forms of the improvements contemplated herein and in the drawings like reference characters identify the same parts in the several views.

In the exemplary embodiment of the invention depicted in Figs. 1 and 2, the one-way clutch assembly is designated in its entirety by the numeral 10 and comprises generally, an inner race member 20 which may be a rotatable shaft having a camming surface 21, an outer member 22 having a central through bore 23 arranged to receive portions of the inner race member 20.

said outer member being mounted on said inner race member 20 for relative co-axial rotation therebetween, said outer member 22 having a plurality of recesses 24, 25 and 26 each opening into said through bore 23 and each respectively having an arcuate inner surface 27, 28 and 29, spring clips 30, 31 and 32 of a shape corresponding to the internal surfaces of said recesses and respectively disposed one in each recess as shown, and sprags 33, 34 and 35 respectively disposed one in each recess as shown and each having opposite arcuate surfaces 40 and 41 adapted respectively to wedgingly engage surfaces of the spring clips and the camming surface 21 of the inner member 20, each of said spring clips being provided with an integral struck-out portion 43 adapted to resiliently engage portions of an adjacent sprag effective to maintain the relative disposition of the sprag during certain operations of the device.

In Fig. 1 it can be seen that the outer member 22 can be directly mounted on the inner member 20 for relative co-axial rotation therebetween, thereby eliminating the heretofore necessary spacer or bearing members which were required to maintain the inner and outer members of one-way clutch assemblies in concentric spaced relationship.

Although either the outer member 22 or the inner member 20 could be the driving member, for purposes of illustration and for a clear understanding of the operation of the device, the inner member is selected as the driving member and the outer member then will become the driven member, said driving member being normally rotated in a clockwise direction as indicated by the arrow thereby to cause the driving engagement of the sprag members as will be more fully described hereinafter.

Since each of the sprags are of identical construction, it is deemed sufficient for all intentions and purposes herein contained to describe only one of them. In accordance with this invention and as illustrated in Fig. 1, the sprags are formed with flat parallel sides 50 and 51 connected by the arcuate portions 40 and 41 to form a generally parallelogram figure with diagonals of unequal length, thereby to cause the wedging angle to increase as the grip of the sprag on the adjacent respective gripping surfaces of the outer and inner members tightens which increases the torque capacity of the clutch. As indicated, the arcuate portion 41 of the sprag 33 is formed about a spaced center eccentric to the center line of the sprag and lying at a predetermined angle to a perpendicular line to the surfaces 50 and 51. The arcuate portion 40 defines an arc whose center is preferably located on the vertical center line through the sprag. It is notable that the surfaces 40 and 41 of the sprags are through arcs and the centers therefor are preferably so located as to produce a nearly constant wedge angle which has been found to produce satisfactory gripping ability without excessive bursting force.

The sprags may be made in any desired way, as by turning from bar stock, drawing through a die or the like. They are preferably hardened by any approved practice such as, for example, by heat treatment or the like either before or after forming and the sprags may be finished by grinding or polishing after the heat treatment if desired.

Attention is invited to Figs. 1 and 5 which disclose the construction of the spring clips as being formed to define a shape corresponding to the internal surfaces presented by the recesses in the outer member. As can be seen in Fig. 1, the internal surface of the spring clip adjacent to the arcuate surface 40 of the sprag presents a camming surface cooperating with the camming surface 21 of the inner member to effect the wedging engagement of the outer and inner member.

An important feature of the invention in the provision of these clips is that they may be formed of a hard wear resisting material and are readily and conveniently removable and replaceable for repair purposes. The fact that no wedging action is presented to the outer member per se provides the advantage that this outer member may be formed of any suitable metal such as, for example, a casting and the outer member need not be finished except for the central through bore 23.

In order to assure proper relative disposition of the sprags in their various operative positions, there is provided the struck-out portion 43 which is adapted to resiliently engage portions of the side 51 of the sprags. Thus, when the inner member 20 is rotated clockwise the wedging effect of the sprags against the camming surfaces of the spring clips and the camming surface 21 will be operative and when the inner member 20 is rotated counterclockwise the heretofore described wedging engagement will tend to become released and the outer and the inner members are then free for co-axial relative rotation therebetween but the sprags are maintained and are constantly urged in their proper position by virtue of the engagement therewith of the struck-out portions 43 of the spring clips so that there will be a relatively quick wedging engagement of the sprag members when the inner member 22 is again rotated in a clockwise direction.

In the event that both the inner and outer members are rotating in the same direction with the inner member rotating at a speed slower than the outer member, the two members would be free for relative rotation therebetween but if the inner member should increase its speed beyond that of the outer member then the wedging action hereinbefore described would become operative and the inner and outer members would rotate at the same speed.

Through apertures 60, 61 and 62 are provided to receive respectively a bolt as at 63 for the purpose of securing the outer member 22 to a power transmission element 64 which may be, for example, a sprocket or gear or the like.

In the modified embodiment of the invention depicted in Figs. 3 and 4 the general operation is similar to that as disclosed in Figs. 1 and 2 with the exception that the spring clips as at 70 are disposed in a recess as at 71 which is located in the inner member 72 fixed to a shaft 73 by virtue of a key 74 and the outer member as at 75 may be a sprocket element or a gear or the like. The inner member may be effectively retained in its position on the shaft 73 by virtue of the collars 76 and 77 and the sprocket element 75 may be retained in its relative operative position by virtue of suitable snap rings as at 78 and 79. The sprags and the general operation are identical to that structure disclosed with respect to Figs. 1 and 2.

The device may be lubricated in a conventional manner by virtue of the oil groove 80 serviced by the inlet valve 81.

It can be seen that in each of the constructions disclosed there is provided ease in assembly and that the replaceability of the spring clips will substantially increase the life span of the clutch assembly in that these clips may be repaired or replaced as needed without necessitating the replacement or destruction of the outer member.

From the foregoing disclosure, it can be seen that I have provided a one-way clutch which efficiently fulfills the objects therefor as hereinbefore set forth and provides numerous advantages which may be summarized as follows:

1. Structurally simple, efficient and durable;
2. Economical to manufacture and readily adaptable to mass production manufacturing principles;
3. Capable of being made in small dimensions; and
4. Quick acting.

While I have illustrated a preferred embodiment of my invention, many modifications may be made without departing from the spirit of the invention, and I do not wish to be limited to the precise details of construction set forth but desire to avail myself of all changes within the scope of the appended claims.

I claim:

1. A one-way engaging device comprising co-axially arranged relatively rotatable members one mounted on the other, one of said members having a plurality of circumferentially spaced recesses disposed adjacent the other member, said other member having a smooth and continuous camming surface, wedge elements respectively disposed in each of said recesses and adapted to permit rotation of one of said members relative to the other of said members in one direction and providing a wedging action on said members preventing rotation of said one member relative to the other member in the other direction, each of said wedge elements defining a parallelogram figure in section and defining a pair of arcuate camming surfaces, spring clip means removably disposed in said recesses and forming a liner therefor substantially lining a major portion of said recesses to present a camming surface, said liner preventing said wedge element from contacting the member containing said recesses, said wedge elements having a camming surface adapted to wedgingly engage the camming surface of said spring clip means and any portion of the camming surface of the other of said members to effect quick acting wedging engagement, and resilient means forming an integral part of said spring clip means and adapted to engage portions of adjacent wedge elements effective to maintain said wedge elements in predetermined operative positions.

2. A one-way engaging device comprising co-axially arranged relatively rotatable members one of which is provided with a plurality of circumferentially spaced recesses disposed adjacent the other member, said other member having a smooth and continuous camming surface adjacent to said one member, means removably disposed in said recesses to form a liner therefor substantially lining a major portion of said recesses and provide a camming surface, a sprag operatively associated with each of said liner means, resilient means forming an integral part of said liner means and adapted to engage portions of adjacent sprags effective to maintain said sprags in predetermined operative positions, each of said sprags defining a parallelogram figure in section with diagonals of unequal length and having a first arcuate portion formed about a spaced center eccentric to the center line of the sprag and lying at a predetermined angle to a perpendicular to the side surfaces of the sprag, and each of said sprags having a second arcuate portion opposite to said first arcuate portion and defining an arc whose center is located on a center line through the sprag, said first arcuate portion being adapted to engage any portion of the camming surface of one of said members and said second arcuate portion being adapted to engage the camming surface of said liner means, said liner further preventing said sprags from contacting the member containing said recesses, thereby to permit rotation of one member relative to the other member in one direction and provide an instantaneous wedging action and as aforesaid preventing rotation of said one member relative to the other member in the other direction.

3. A one-way engaging device comprising co-axially arranged relatively rotatable members one mounted on the other, one of said members having a plurality of circumferentially spaced recesses adjacent the other member, said other member having a smooth and continuous camming surface, spring clip means removably disposed in said recesses and forming a liner therefor substantially lining a major portion of said recesses to present a camming surface, and a plurality of wedge elements one disposed adjacent each spring clip means and each having portions engageable with an adjacent portion of the camming surface of said other members and adapted to permit rotation of one of said members relative to the other of said members in one direction and providing an instantaneous wedging action by cooperation between said members and preventing rotation of said one member relative to the other member in the other direction, said liner preventing contact between said wedge elements and said one of said members, and said spring clip means being formed to define a generally U-shape with one leg of said U having a struck-out portion in engagement with portions of adjacent wedge elements and maintaining said wedge elements in predetermined operative positions.

4. In a one-way engaging device for operation with co-axially arranged relatively rotatable members one of which is provided with a plurality of circumferentially spaced recesses disposed adjacent the other member, said other member having a smooth and continuous camming surface, spring clip means removably disposed in said recesses and forming a liner therefor substantially lining a major portion of said recesses to prevent a camming surface, a wedge element operatively associated with each of said spring clip means, said spring clip means preventing contact between said wedge element and said member containing said recesses, resilient means forming an integral part of said spring clip means and adapted to engage portions of adjacent wedge elements effective to maintain said wedge elements in predetermined operative positions, each of said wedge elements defining a parallelogram figure in section with diagonals of unequal length and having a first arcuate portion formed about a spaced center eccentric to the center line of the wedge element and lying at a predetermined angle to a perpendicular to the side surfaces of the wedge element, and each of said wedge elements having a second arcuate portion opposite to said first arcuate portion and defining an arc whose center is located on a center line through the wedge element, said first arcuate portion being adapted to engage any portion of the camming surface of one of said members and said second arcuate portion being adapted to engage the camming surface of said spring clip means, thereby to permit rotation of one member relative to the other member in one direction and provide an instantaneous wedging action and as aforesaid preventing rotation of said one member relative to the other member in the other direction.

5. A one-way engaging device comprising coaxially arranged relatively rotatable members one of which is provided with a plurality of circumferentially spaced recesses disposed adjacent the other member, said other member having a continuous smooth surface, a plurality of wedge elements and spring means disposed in said recesses, each of said wedge elements defining a parallelogram figure in section and defining a pair of arcuate camming surfaces, said spring means conforming to a major portion of the internal surfaces of said recesses and forming a base for said wedge elements and preventing said wedge elements from contacting said rotatable member containing said recesses, said wedge elements having camming surfaces adapted to wedgingly engage any portion of said continuous camming surface to instantaneously cause clutching action and prevent relative rotation of said coaxially arranged members, and said spring means being formed to define a generally U-shape with one leg of said U having a struck-out portion in engagement with portions of adjacent wedge elements and maintaining said wedge elements in predetermined operative positions.

RALPH E. CHERRY.

References Cited in the file of this patent

UNITED STATES PATENTS

| Number | Name | Date |
|---|---|---|
| 800,853 | Kimball | Oct. 3, 1905 |
| 1,850,510 | Lloyd, Sr. | Mar. 22, 1932 |
| 1,942,909 | Von Thungen | Jan. 9, 1934 |
| 2,385,799 | Dodge | Oct. 2, 1945 |
| 2,428,968 | Gruenberg | Oct. 14, 1947 |

FOREIGN PATENTS

| Number | Country | Date |
|---|---|---|
| 689,563 | France | May 27, 1930 |
| 744,283 | France | Jan. 21, 1933 |